(12) United States Patent
Yin et al.

(10) Patent No.: US 8,749,975 B2
(45) Date of Patent: Jun. 10, 2014

(54) COMPUTER SYSTEM WITH AIRFLOW GUIDING DUCT

(75) Inventors: Xiu-Zhong Yin, Shenzhen (CN);
Xiu-Quan Hu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/483,321

(22) Filed: May 30, 2012

(65) Prior Publication Data
US 2013/0100600 A1   Apr. 25, 2013

(30) Foreign Application Priority Data
Oct. 19, 2011   (CN) .......................... 2011 1 0318201

(51) Int. Cl.
*H05K 7/20* (2006.01)
*G06F 1/20* (2006.01)

(52) U.S. Cl.
USPC ....... 361/692; 361/679.48; 361/690; 361/704

(58) Field of Classification Search
USPC ................. 361/679.48–679.51, 690, 692, 361/694–695, 697; 454/184
See application file for complete search history.

(56) References Cited

U.S. PATENT DOCUMENTS

| | | | | |
|---|---|---|---|---|
| 7,495,912 | B2 * | 2/2009 | Long et al. | 361/697 |
| 7,872,866 | B1 * | 1/2011 | Wang | 361/695 |
| 8,081,444 | B2 * | 12/2011 | Xiao et al. | 361/679.49 |
| 2007/0091566 | A1 * | 4/2007 | Sun | 361/695 |
| 2012/0008276 | A1 * | 1/2012 | Cheng | 361/679.48 |

FOREIGN PATENT DOCUMENTS

| | | | | |
|---|---|---|---|---|
| CN | 201115221 | * | 9/2008 | H05K 7/20 |
| KR | 100642510 | * | 11/2006 | G06F 1/20 |

* cited by examiner

*Primary Examiner* — Robert J Hoffberg
(74) *Attorney, Agent, or Firm* — Novak Druce Connolly Bove + Quigg LLP

(57) ABSTRACT

A computer system includes an enclosure, a printed circuit board, and an airflow guiding duct. The enclosure includes a bottom plate. The printed circuit board is mounted on the bottom plate. The printed circuit board includes a first heat generating element and a second heat generating element. The airflow guiding duct includes a top wall, a first sidewall, a second sidewall, a first mounting wall, and a second mounting wall. An input opening is surrounded by the top wall and the first and second sidewalls. A first output opening corresponds to the first heat generating element, and is surrounded by the top wall and the first and second mounting walls. A second output opening is defined in the second sidewall corresponding to the second heat generating element. An obtuse angle is defined between the second sidewall and the second mounting wall.

20 Claims, 6 Drawing Sheets

COMPUTER SYSTEM WITH AIRFLOW GUIDING DUCT

BACKGROUND

1. Technical Field

The present disclosure relates to computer systems, and more particularly to a computer system with an airflow guiding duct.

2. Description of Related Art

Heat dissipating devices remove heat from electronic devices. A typical heat dissipating device often includes one or more fans received in a bracket. Air from outside of the electronic device is directed inside and then back out of the electronic device by the fan, for dissipating the heat generated in the electronic device. However, if the air flow through the electronic device becomes disorderly, the heat dissipating efficiency of the electronic device will decrease.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
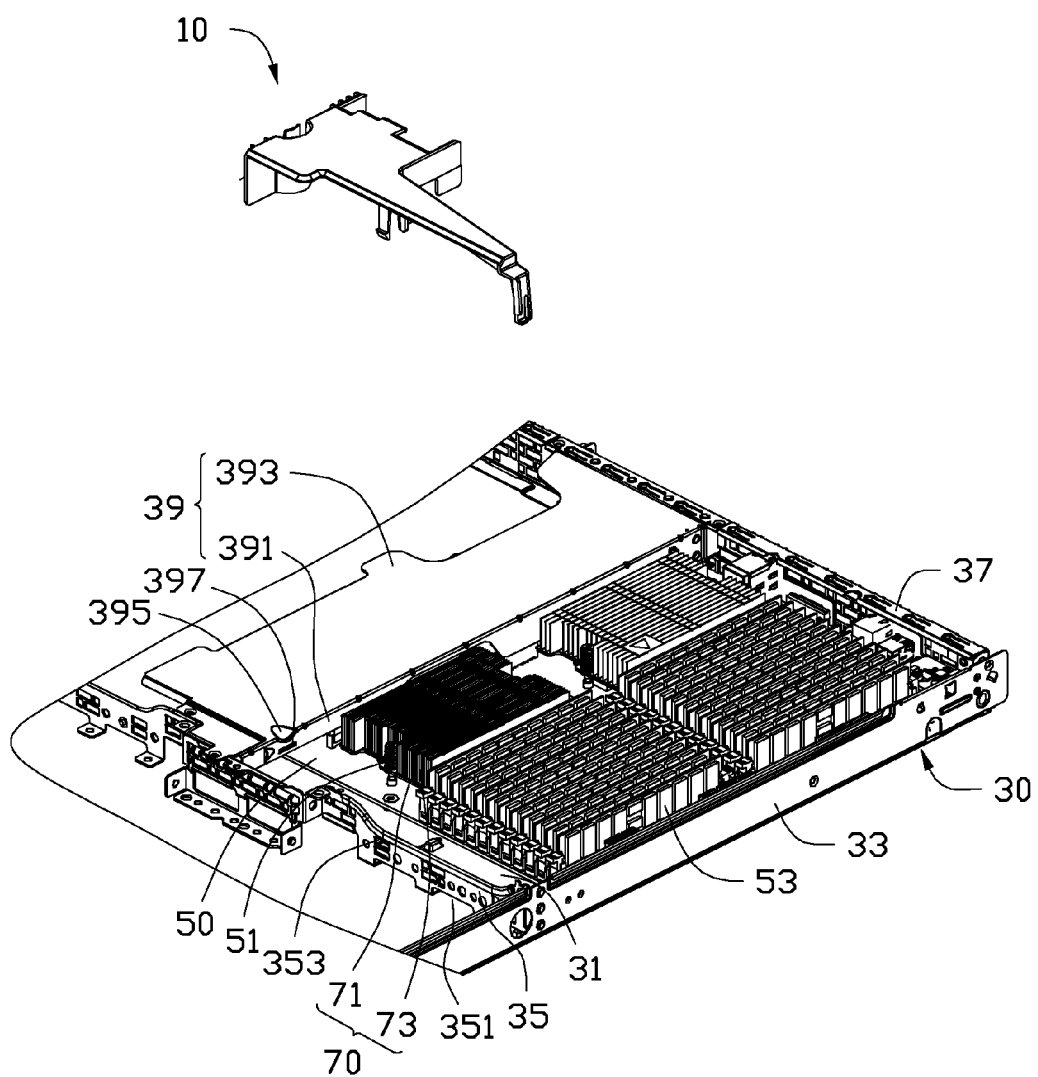
FIG. 1 is an isometric, exploded view of an embodiment of a computer system.
Figure 2:
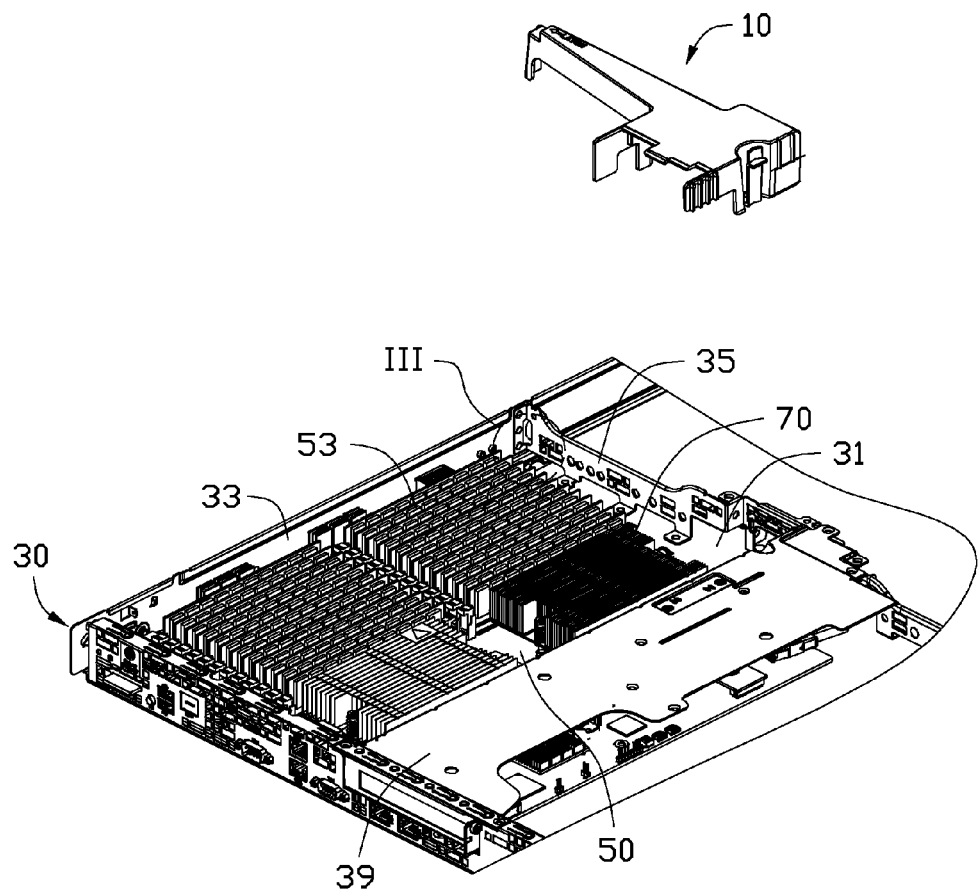
FIG. 2 is similar to FIG. 1, but viewed from another aspect.
Figure 3:
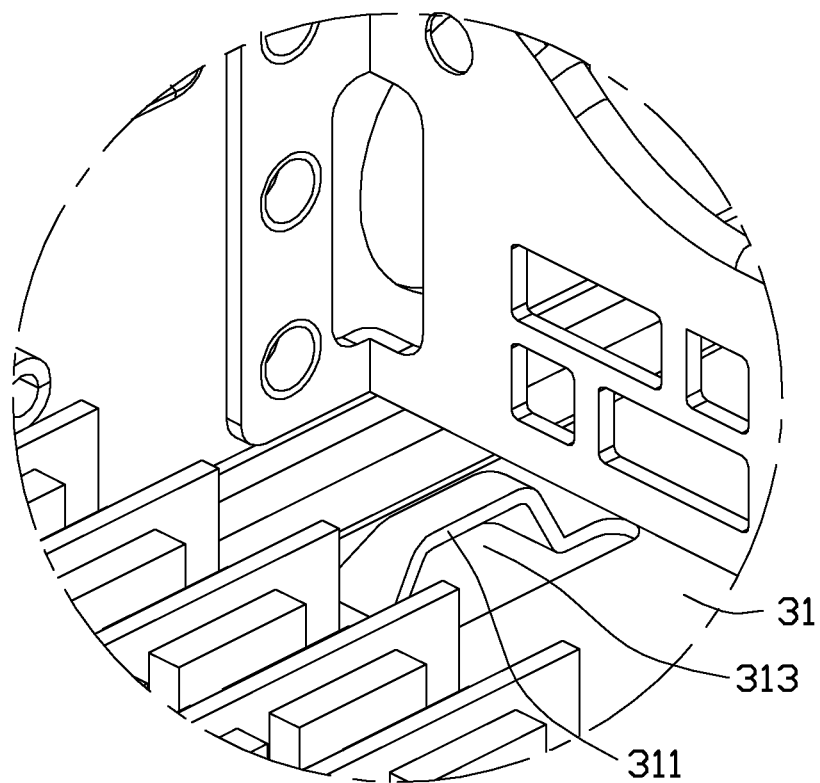
FIG. 3 is a partial, enlarged view of portion III of FIG. 2.

Referring to FIGS. 1, 2, and 3, a computer system in accordance with an embodiment includes an airflow guiding duct 10, an enclosure 30, a printed circuit board 50, and a heat sink 70 mounted in the enclosure 30.

The enclosure 30 includes a bottom plate 31, a side plate 33, a separating plate 35, and a rear plate 37 extending from the bottom plate 31. The side plate 33, the separating plate 35, and the rear plate 37 are substantially perpendicular to the bottom plate 31. The separating plate 35 is substantially parallel to the rear plate 37. The separating plate 35 is substantially perpendicular to the side plate 33. The enclosure 30 further includes a securing portion 311. The securing portion 311 can be U-shaped. The securing portion 311 defines a securing opening 313. The separating plate 35 defines a plurality of airflow openings 351 and an engaging hole 353. The enclosure 30 further includes a mounting element 39. The mounting element 39 includes a mounting panel 391 and an extending panel 393 substantially perpendicular to the mounting panel 391. The mounting panel 391 is substantially perpendicular to the bottom plate 31 and the separating plate 35. The mounting element 39 further includes a cutout 395 in the area where the mounting panel 391 meets the extending panel 393. The mounting panel 391 defines a mounting opening 397.

The printed circuit board 50 is mounted between the separating plate 35 and the rear plate 37. The printed circuit board 50 includes a first heat generating element 51 and a plurality of second heat generating elements 53. The second heat generating elements 53 are substantially parallel to each other and the side plate 33. The heat sink 70 is mounted on the first heat generating element 51. In one embodiment, the second heat generating elements 53 are memory cards. The heat sink 70 includes a base 71 and a plurality of fins 73 extending from the base 71. The fins 73 are substantially parallel to each other and the second heat generating element 53.

Figure 4:
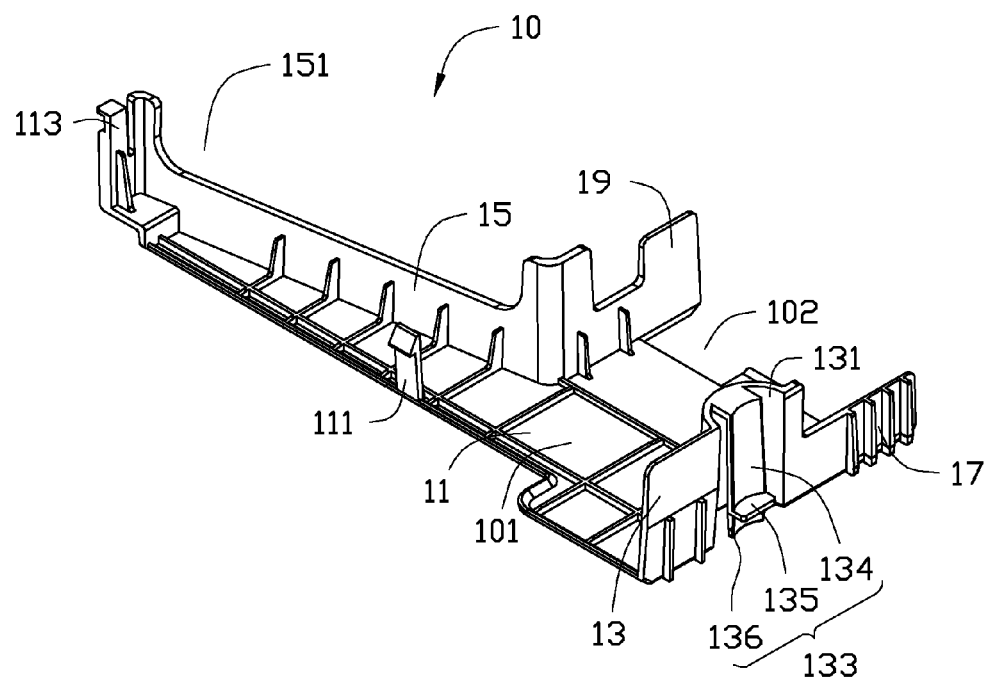
FIG. 4 is an isometric view of an airflow guiding duct of FIG. 1.
Figure 5:
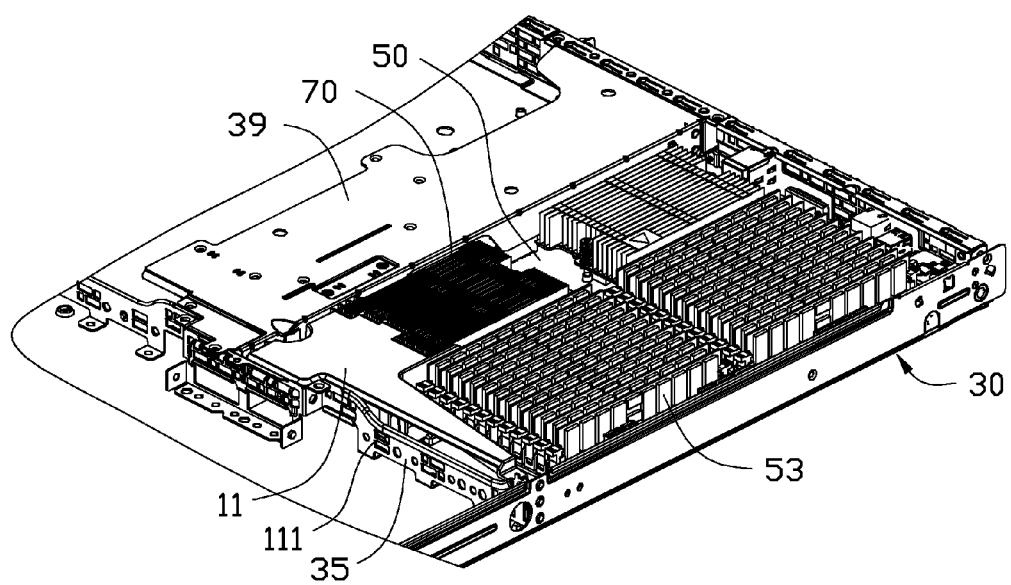
FIG. 5 is an assembled view of FIG. 1.
Figure 6:
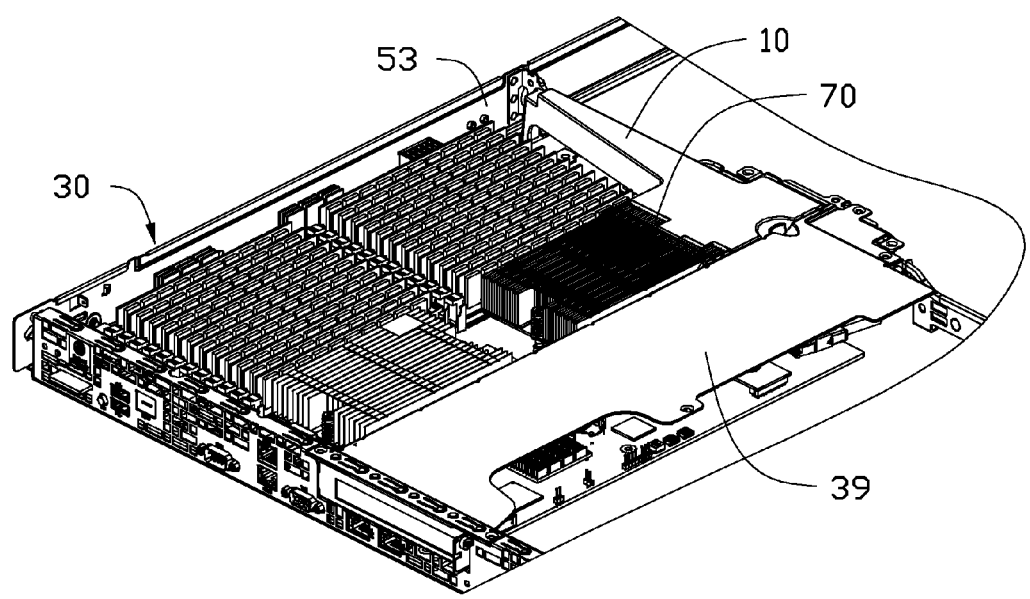
FIG. 6 is similar to FIG. 5, but viewed from another aspect.

Referring to FIGS. 4 and 5, the airflow guiding duct 10 includes a top wall 11, a first sidewall 13, a second sidewall 15 extending from opposite sides of the top wall 11, a first mounting wall 17 extending from the first sidewall 13, and a second mounting wall extending from the second sidewall 15. The first mounting wall 17 and the second mounting wall 19 are substantially parallel to the side plate 33. The airflow guiding duct 10 includes an engaging portion 111 extending from the top wall 11 corresponding to the engaging hole 353 of the separating plate 35. The engaging portion 111 is substantially perpendicular to the top wall 11. The first sidewall 13 includes a recess portion 131. In one embodiment, the recess portion 131 is arc-shaped. The airflow guiding duct 10 further includes a securing tab 133. The securing tab 133 includes a connecting arm 134 connected to the recess portion 131, a securing protrusion 135 extending from the connecting arm 134, and a handle portion 136 extending from the securing protrusion 135. The securing protrusion 135 corresponds to the mounting opening 397 of the mounting panel 391. The first mounting wall 17 is substantially parallel to the second mounting wall 19. An obtuse angle is defined between the second sidewall 15 and the second mounting wall 19. An input opening 101 is surrounded by the top wall 11, the first sidewall 13, and the second sidewall 15. A first output opening 102 is surrounded by the top wall 11, the first mounting wall 17, and the second mounting wall 19. The second sidewall 15 defines a second output opening 151. The airflow guiding duct 10 further includes a securing arm 113 extending from the top wall 11 corresponding to the securing opening 313 of the bottom plate 31. The securing arm 113 is substantially perpendicular to the top wall 11.

Referring to FIGS. 1-6, in assembly, the securing arm 113 of the airflow guiding duct 10 engages in the securing opening 313. The engaging portion 111 of the airflow guiding duct 10 engages in the engaging hole 353 of the separating plate 35. The securing protrusion 135 of the securing tab 133 of the airflow guiding duct 10 engages in the mounting opening 397 of the mounting panel 391, thereby securing the airflow guiding duct 10 to the enclosure 30. At this time, the heat sink 70 is located between the first mounting wall 17 and the second mounting wall 19. The second output opening 151 of the second sidewall 15 corresponds to the second heat generating element 53. The input opening 101 corresponds to the airflow openings 351 of the separating plate 35. The first output opening 102 corresponds to the heat sink 70.

In use, air flows into the input opening 101 of the airflow guiding duct 10 via the airflow openings 351 of the separating plate 35. Some of the air flows to the heat sink 70 via the first output opening 102, and some of the air flows to the second heat generating elements 53 via the second output opening 151.

In disassembly, the handle portion 136 of the airflow guiding duct 10 is pressed to drive the securing protrusion 135 to disengage from the mounting opening 397. The airflow guiding duct 10 is moved away from the separating plate 35 to enable the engaging portion 111 to move out of the engaging hole 353. The airflow guiding duct 10 is pulled upward to enable the securing arm 113 to disengage from the securing opening 313, thereby removing the airflow guiding duct 10 from the enclosure 30.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A computer system, comprising:
    an enclosure comprising a bottom plate, a mounting panel and a separating plate each extending from the bottom plate;
    a printed circuit board mounted on the bottom plate and substantially parallel to the bottom plate, the printed circuit board comprising a first heat generating element and a second heat generating element; and
    an airflow guiding duct comprising a top wall, a first sidewall, a second sidewall, a first mounting wall extending from the first sidewall, and a second mounting wall extending from the second sidewall, wherein the first sidewall, the second sidewall, the first mounting wall, and the second mounting wall are connected to the top wall; an input opening is surrounded by the top wall, the first sidewall, and the second sidewall; a first output opening is defined by the top wall, the first mounting wall, and the second mounting wall, the first output opening corresponds to the first heat generating element; the first heat generating element is located between the first mounting wall and the second mounting wall; a second output opening is defined in the second sidewall corresponding to the second heat generating element; an obtuse angle is defined between the second sidewall and the second mounting wall,
    wherein the airflow guiding duct is removeably coupled to each of the bottom plate, the mounting panel, and the separating plate.

2. The computer system of claim 1, wherein the airflow guiding duct further comprises a securing tab extending from the first sidewall; and the mounting panel defines a mounting opening to receive the securing tab.

3. The computer system of claim 2, wherein the securing tab comprises a connecting arm extending from the first sidewall, a securing protrusion extending from the connecting arm, and a handle portion extending from the securing protrusion; and the securing protrusion is engageable in the mounting opening.

4. The computer system of claim 3, wherein the first sidewall comprises a recess portion; the connecting arm is connected to the recess portion; and the handle portion is configured to be pressed towards the recess portion to drive the securing protrusion to disengage from the mounting opening.

5. The computer system of claim 3, wherein the enclosure further comprises an extending panel connected to the mounting panel, and a cutout corresponding to the handle portion is defined in a connection between the mounting panel and the extending panel.

6. The computer system of claim 1, wherein the enclosure further comprises a rear plate extending from the bottom plate; the rear plate and the separating plate are substantially perpendicular to the bottom plate; the printed circuit board is located between the rear plate and the separating plate; and the separating plate defines an airflow opening corresponding to the input opening.

7. The computer system of claim 1, wherein the airflow guiding duct further comprises an engaging portion extending from the top wall; and the separating plate defines an engaging hole corresponding to the engaging portion.

8. The computer system of claim 1, wherein the bottom plate comprises a securing portion; the securing portion defines a securing opening; the airflow guiding duct further comprises a securing arm extending from the top wall; the securing arm is engageable in the securing opening.

9. The computer system of claim 1, wherein the first mounting wall is substantially parallel to the second mounting wall.

10. The computer system of claim 9, further comprising a heat sink mounted on the first heat generating element, wherein the heat sink comprises a plurality of fins substantially parallel to each other and the first mounting wall.

11. A computer system, comprising:
    an enclosure comprising a bottom plate, a mounting panel and a separating plate each extending from the bottom plate;
    a printed circuit board mounted in the enclosure, the printed circuit board comprising a first heat generating element and a second heat generating element; and
    an airflow guiding duct comprising a top wall, a first sidewall, a second sidewall, a first mounting wall extending from the first sidewall, and a second mounting wall extending from the second sidewall, wherein the first sidewall, the second sidewall, the first mounting wall, and the second mounting wall are connected to the top wall; an input opening is defined by the top wall, the first sidewall, and the second sidewall; a first output opening is surrounded by the top wall, the first mounting wall, and the second mounting wall; the first output opening corresponds to the first heat generating element; the first heat generating element is located between the first mounting wall and the second mounting wall; a second output opening is defined in the second sidewall corresponding to the second heat generating element; the second sidewall has a first end connected to the second mounting wall and a second end; and a distance between the first end and the first sidewall is less than a distance between the second end and the first sidewall,
    wherein the airflow guiding duct is removeably coupled to each of the bottom plate, the mounting panel, and the separating plate.

12. The computer system of claim 11, wherein the airflow guiding duct further comprises a securing tab extending from the first sidewall; and the mounting panel defines a mounting opening to receive the securing tab.

13. The computer system of claim 12, wherein the securing tab comprises a connecting arm extending from the first sidewall, a securing protrusion extending from the connecting arm, and a handle portion extending from the securing protrusion; and the securing protrusion is engageable in the mounting opening.

14. The computer system of claim 13, wherein the first sidewall comprises a recess portion; the connecting arm is connected to the recess portion; and the handle portion is configured to be pressed towards the recess portion to drive the securing protrusion to disengage from the mounting opening.

15. The computer system of claim 13, wherein the enclosure further comprises an extending panel connected to the mounting panel, and a cutout corresponding to the handle portion is defined in a connection between the mounting panel and the extending panel.

16. The computer system of claim 11, wherein the printed circuit board is mounted on the bottom plate and is substantially parallel to the bottom plate; the rear plate and the separating plate are substantially perpendicular to the bottom plate; the printed circuit board is located between the rear plate and the separating plate; and the separating plate defines an airflow opening corresponding to the input opening.

17. The computer system of claim 16, wherein the bottom plate comprises a securing portion; the securing portion defines a securing opening; the airflow guiding duct further comprises a securing arm extending from the top wall; the securing arm is engageable in the securing opening.

18. The computer system of claim 11, wherein the airflow guiding duct further comprises an engaging portion extending from the top wall; and the separating plate defines an engaging hole corresponding to the engaging portion.

19. The computer system of claim 11, wherein an obtuse angle is defined between the second sidewall and the second mounting wall.

20. The computer system of claim 19, further comprising a heat sink mounted on the first heat generating element, wherein the first mounting wall is substantially parallel to the second mounting wall; the heat sink comprises a plurality of fins substantially parallel to each other and the first mounting wall.

* * * * *